United States Patent
Nagai et al.

(10) Patent No.: US 6,930,264 B2
(45) Date of Patent: Aug. 16, 2005

(54) SWITCH STRUCTURE OF LAMP UNIT

(75) Inventors: Kentaro Nagai, Shizuoka (JP); Mitsuyoshi Ohno, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/744,078

(22) Filed: Dec. 24, 2003

(65) Prior Publication Data

US 2004/0179370 A1 Sep. 16, 2004

(30) Foreign Application Priority Data

Dec. 26, 2002 (JP) .................................... P2002-377948

(51) Int. Cl.$^7$ ................................................ H01H 1/36
(52) U.S. Cl. .................... 200/252; 200/530; 200/547
(58) Field of Search ............................... 200/252, 530, 200/531, 536, 547

(56) References Cited

U.S. PATENT DOCUMENTS

| | | | | | |
|---|---|---|---|---|---|
| 3,857,000 | A | * | 12/1974 | Boulanger | ................ 200/16 D |
| 4,983,795 | A | * | 1/1991 | Suzuki | ........................ 200/550 |
| 5,122,627 | A | * | 6/1992 | Trana | .......................... 200/548 |
| 5,720,385 | A | * | 2/1998 | Uchiyama | .................... 200/549 |
| 6,084,192 | A | * | 7/2000 | Honma | ........................ 200/547 |
| 6,204,461 | B1 | * | 3/2001 | Bucher et al. | .............. 200/330 |
| 6,262,379 | B1 | * | 7/2001 | Tajima | ........................ 200/5 R |
| 6,376,790 | B1 | * | 4/2002 | Kawase | ....................... 200/547 |

FOREIGN PATENT DOCUMENTS

JP          2002-79879 A       3/2002

\* cited by examiner

*Primary Examiner*—Richard K. Lee
(74) *Attorney, Agent, or Firm*—Sughrue Mion, PLLC

(57) ABSTRACT

A switch structure of a lamp unit mounted at an interior wall member, includes a switch member and a switch knob. The switch member includes a switch lever which slides in a first direction for turning on or off the lamp unit. The switch knob includes an engagement portion for engaging with the switch lever of the switch member, and the switch knob being slidably retained on a design member. The switch lever is inserted in the engagement portion of the switch knob in the first direction and in a second direction in which the design member is mounted to the interior wall member while the engagement portion is elastically deformed.

7 Claims, 8 Drawing Sheets

SWITCH STRUCTURE OF LAMP UNIT

BACKGROUND OF THE INVENTION

This invention relates to a switch structure of a lamp unit such as a room lamp, which is mounted at a lamp-mounting window formed in an interior wall member (such as a roof trim) covering a vehicle body panel.

In one related structure, a lamp unit such as a room lamp is beforehand mounted on an interior wall member (such as a roof trim) to form a roof module, and this roof module is mounted on a vehicle body panel, thereby enhancing the efficiency of the lamp unit-mounting operation. JP-A-2002-79879 (Pages 15 to 17, FIGS. 19 to 22) discloses one example of such lamp unit-mounting structures as shown in FIG. 6.

In this lamp unit-mounting structure, a room lamp (lamp unit) 3 is mounted at a lamp-mounting window 2 formed in a roof trim (interior wall member) 1 covering a vehicle body panel (not shown).

The room lamp 3 includes a lamp function portion A having a switch unit 4, and a design portion B including a cover lens 8 having a switch knob 7 slidably retained thereon. The switch knob 7 has an engagement portion 17 engaged with a switch lever 5 of the switch unit 4. The cover lens 8 is mounted on the roof trim 1 from the inside of a car room, Wires such as an FFC (flexible flat cable) 10 are connected to wire connection portions (not shown) of a switching circuit of the switch unit 4. The switch lever 5 for activating and deactivating the switching circuit capable of switching a bulb 11 of the lamp function portion A between the ON and OFF states is provided at the switch unit 4.

The switch knob 7 is beforehand slidably retained in a slide groove 13 formed in the cover lens 8. The cover lens 8 is mounted on the roof trim 1 from the inside of the car room to cover the lamp-mounting window 2, with retaining projections 14 engaged respectively in engagement holes 15 in the roof trim 1.

A pair of limitation projections 16 are formed on an inner surface the cover lens 8, and are disposed near to the slide groove 13, and these limitation projections 16 hold the switch unit 4 therebetween to limit or prevent the displacement of the cover lens 8 relative to the lamp function portion A in a direction of sliding of the switch knob 7.

The switch knob 7 has the engagement portion 17 in which a distal end portion of the switch lever 5 can be engaged. As shown in FIG. 7A, this engagement portion 17 is formed or defined by a pair of elastic arms 18 each having opposite end portions extending obliquely inwardly in a direction of the width of the slide groove 13. This engagement portion 17 serves as a retaining unit into which the distal end portion of the switch lever 5 can be inserted in the sliding direction.

Therefore, the distal end portion of the switch lever 5 can be inserted into the engagement portion 17 while elastically deforming the opposed elastic arms 18 in the sliding direction (see FIG. 7B). The distal end portion of the switch lever 5, thus received in the engagement portion 17, is retained by the elastic arms 18 against disengagement therefrom in the sliding direction.

When the room lamp 3 is to be mounted on the roof trim 1 to form a roof module, first, the lamp function portion A is mounted at th lamp-mounting window 2 in the roof trim 1, and then the cover lens 8 is attached to the room trim 1 to cover the lamp-mounting window 2, with the retaining projections 14 of the cover lens 8 engaged respectively in the engagement holes 15 in the room trim 1.

At this time, the distal end portion of the switch lever 5 is not engaged in the engagement portion 17 of the switch knob 7 as shown in FIG. 7A since the cover lens 8 is merely mounted relative to the lamp-mounting window 2. However, merely by sliding the switch knob 7 in a direction of an arrow in FIG. 7A after this mounting operation, the distal end portion of the switch lever 5 can be inserted into the engagement portion 17 as shown in FIG. 7B.

Therefore, at the time of mounting the cover lens 8 relative to the lamp-mounting window 2, there is no need to adjust the position of the switch knob 7 so that the distal end portion of the switch lever 5 can be positively inserted into the engagement portion 17. Merely by operating the switch knob 7, retained on the cover lens 8, after the cover lens 8 is fixed to the roof trim 1 to cover the lamp-mounting window 2, the retaining unit, provided at the engagement portion 17 of the switch knob 7, allows the switch lever 5 to be inserted into this engagement portion in the sliding direction, and therefore the switch lever 5 is positively engaged in the engagement portion 17 of the switch knob 7.

Therefore, the operator, engaged in this mounting operation, is not required to effect any positioning operation when he fixes the cover lens 8 to the roof trim 1, and ther fore the mounting operation can be carried out asily. And besides, the switch lever 5 can be easily and positively brought into engagement with the engagement portion 17 of the switch knob 7, and therefore a defective connection during the assembling operation is prevented, so that the quality is enhanced.

In the above related lamp unit-mounting structure, however, the retaining unit, provided at the engagement portion 17 of the switch knob 7, is formed by the pair of elastic arms 18 which allow the switch lever 5 to be inserted into the engagement portion only in the sliding direction, and these elastic arms 18 can not be elastically deformed in the direction of mounting of the cover lens 8.

Therefore, when the cover lens 8 is moved so as to be mounted at the lamp-mounting window 2, with the distal end portion of the switch lever 5 so disposed as to abut against the elastic arms 18 of switch knob 7 in the mounting direction, the distal end of the switch lever 5 imparts an impact to upper edges of the elastic arms 18, which results in a possibility that the cover lens 8 fails to be properly mounted, thus inviting the defective connection, and therefore there has been encountered a problem that the efficiency of the mounting operation for the room lamp 3 is not enhanced.

SUMMARY OF THE INVENTION

It is therefore an object of the present invention to provide a switch structure of a lamp unit in which a switch lever will not impart an impact to a retaining unit at the time of mounting a lamp unit, thereby eliminating the possibility of a defective connection, and the mounting of the lamp unit can be effected easily and positively.

In order to achieve the above object, according to the present invention, there is provided a switch structure of a lamp unit mounted at an interior wall member, comprising:

a switch member, including a switch lever which slides in a first direction for turning on or off the lamp unit; and a switch knob, including an engagement portion for engaging with the switch lever, and the switch knob being slidably retained on a design member, wherein the switch lever is inserted in the engagement portion of the switch knob in the first direction and in a second direction in which the design member is mounted to the interior wall member while the engagement portion is elastically deformed.

In the above construction, the engagement portion of the switch knob engaged with the switch lever, is so constructed as to allow the switch lever to be inserted in the engagement portion in the first direction and in the second direction.

Therefore, even when the positional relation between the switch lever and the engagement portion of the switch knob is such that the switch lever abuts against the engagement portion in the second direction during the mounting of the lamp unit, the switch lever will not impart an impact to the engagement portion since this engagement portion can be elastically deformed in the second direction, so that a defective connection will not occur.

Therefore, there can be provided the good switch structure in which the switch lever will not impart an impact to the engagement portion during the mounting of the lamp unit, thereby eliminating the possibility of a defective connection, and the lamp unit can be mounted easily and positively.

Preferably, the engagement portion includes a pair of elastic retaining lances which extend in the first direction. Respective distal ends of the elastic retaining lances are opposed to each other.

Preferably, the engagement portion is elastically deformed in the second direction when the switch lever is inserted in the engagement portion of the switch knob in the second direction.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3A shows a condition before the engagement operation whil FIG. 3B shows a condition after the engagement operation;

FIG. 4A shows a condition before the engagement operation while FIG. 4B shows a condition after the engagement operation;

FIG. 5A shows a condition before the deformation while FIG. 5B shows a condition after the deformation;

FIG. 7A shows a condition before the engagement operation while FIG. 7B shows a condition after the engagement operation.

DETAILED DESCRIPTION OF THE PREFERRED EMBODIMENTS

Figure 1:
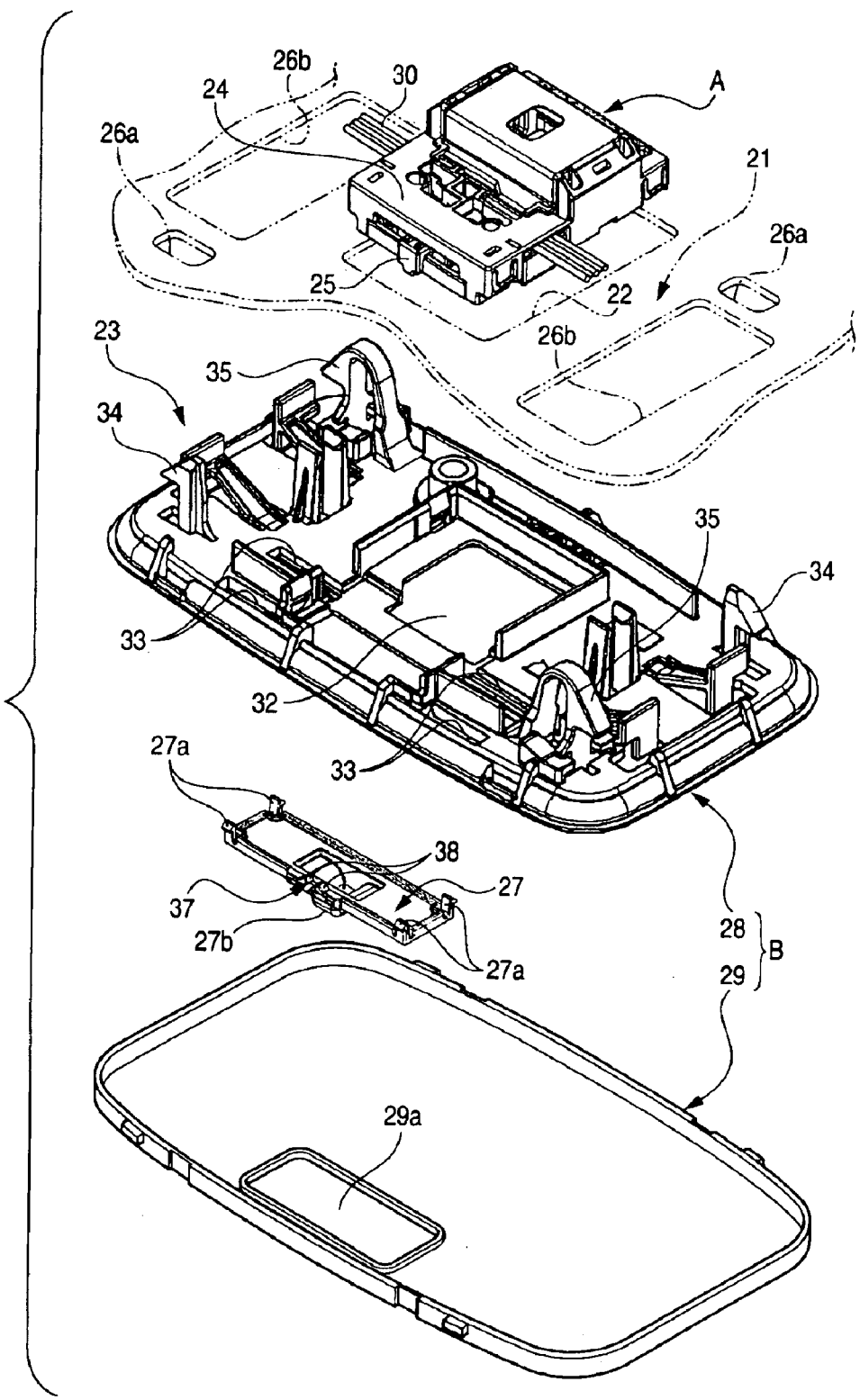
FIG. 1 is an exploded, perspective view explanatory of a lamp unit-mounting structure according one preferred embodiment of the present invention.

One preferred embodiment of a lamp unit-mounting structure of the present invention will now be described in detail with reference to the accompanying drawings.

In one embodiment of the lamp-unit mounting structure of the invention, a room lamp (lamp unit) 23 is mounted at a lamp-mounting window 22 formed in a roof trim (interior wall member) 21 covering a vehicle body panel (not shown).

The room lamp 23 includes a lamp function portion A and a design portion B. The lamp function portion A has a switch unit 24. The design portion 8 includes a holder 28 having the switch knob 27 slidably retained thereon, and a cover lens 29 fitted on the holder 28. The switch knob 27 has the engagement portion 37 engaged with the switch lever 25 of the switch unit 24. The design portion B is mounted on the roof trim 21 from the inside of a car room.

A FFC 30 is connected to wire connection portions (not shown) of a switching circuit of the switch unit 24. The switch lever 25 for activating and deactivating the switching circuit capable of switching a bulb (not shown) of the lamp function portion A between the ON and OFF states is provided at the switch unit 24.

Engaging portions 27a of the switch knob 27 are beforehand slidably fitted in slide grooves 33 formed in the holder 28 of the design portion B, and in this condition the cover lens 28 is fitted on the holder 28. An operating portion 27b of the switch knob 27 projects into the car room through an opening 29a formed through the cover lens 29 (see FIGS. 2 and 3).

A housing fitting hole 32 in which the lamp function portion A is fitted is formed through a central portion of the holder 28.

Engagement claws 34 on the holder 28 are engaged respectively in engagement holes 26a in the roof trim 21 to thereby fix the room lamp 23 to the roof trim 21. Also, a fixing member 35 pass respectively through openings 26b in the roof trim 21, and fix the room lamp 23 to the vehicle body panel (not shown), and by doing so, the design portion B is fixed to a vehicle body without shaking.

Figure 2A:
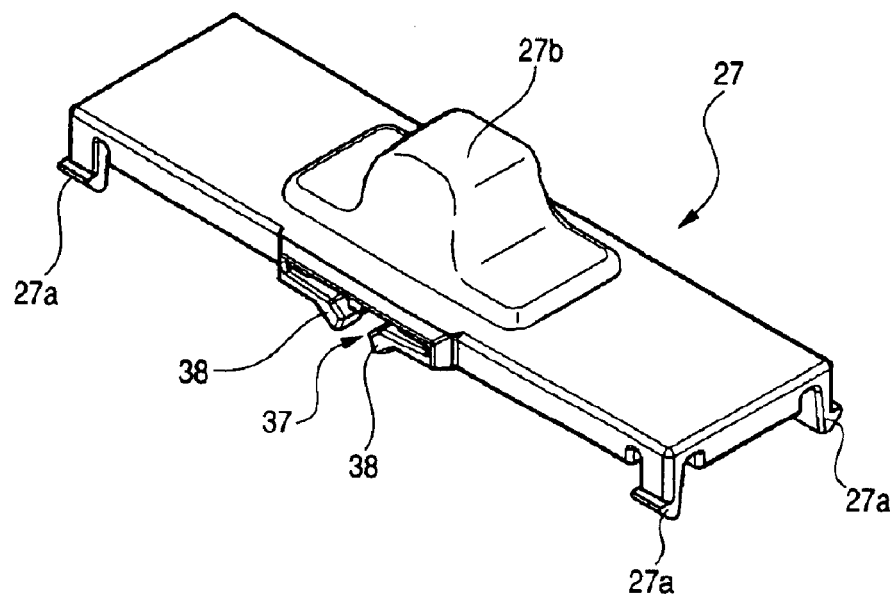
FIG. 2A is a perspective view of a switch knob, showing a front side thereof.
Figure 2B:
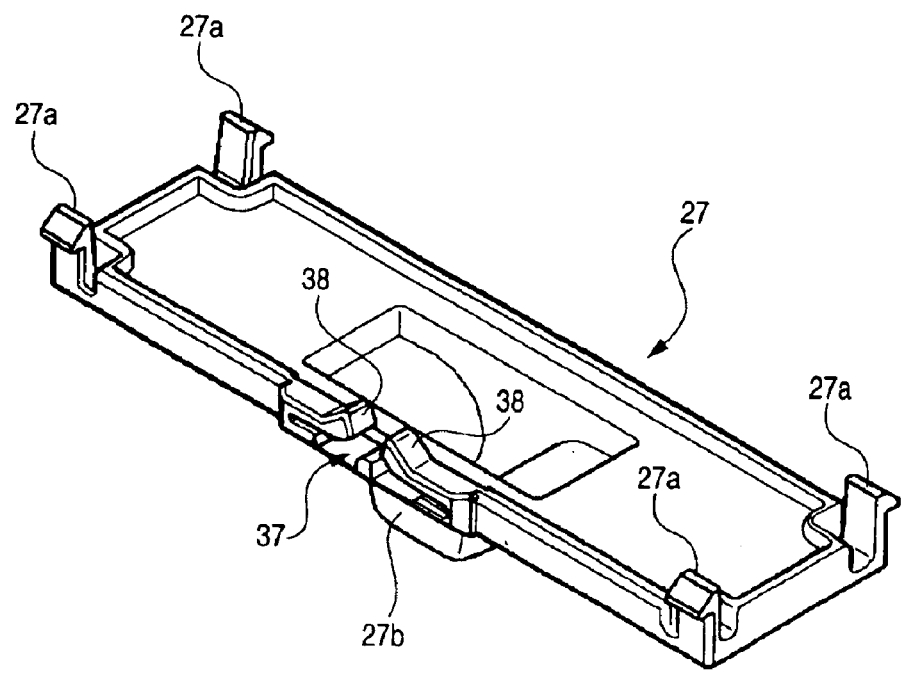
FIG. 2B is a perspective view of the switch knob, showing a reverse side thereof.

As shown in FIG. 2, the switch knob 27 has the engagement portion 37 formed at one side edge portion thereof, and the distal end portion of the switch lever 25 can be engaged with the engagement portion 37.

The engagement portion 37 is formed between distal ends of the pair of elastic retaining lances 38 extending in a direction of sliding of the switch knob 27. This engagement portion serves as the retaining unit which allows the distal end portion 25a of the switch lever 25 to be inserted therein in the sliding direction and in a direction of mounting of the design portion B relative to the roof trim 21.

Therefore, the distal end portion 25a of the switch lever 25 can be inserted into the engagement portion 37 in the sliding direction and in the direction of mounting of the design portion B relative to the roof trim 21 while elastically deforming the elastic retaining lances 38.

Once the distal end portion 25a of the switch lever 25 is inserted in the engagement portion 37, this distal end portion 25a is retained between the distal ends of the pair of elastic retaining lances 38, and therefore can not be disengaged therefrom in the sliding direction.

When the room lamp 23 of this embodiment is to be mounted on the roof trim 21 to form a roof module, first, the lamp function portion A is mounted at the lamp-mounting window 22 of the roof trim 21, and then the design portion B is attached to the room trim 21 to cover the lamp-mounting window 22, with the engagement claws 34 of the holder 28 (forming the design portion B) engaged respectively in the engagement holes 26a in the room trim 21.

Figure 3A:
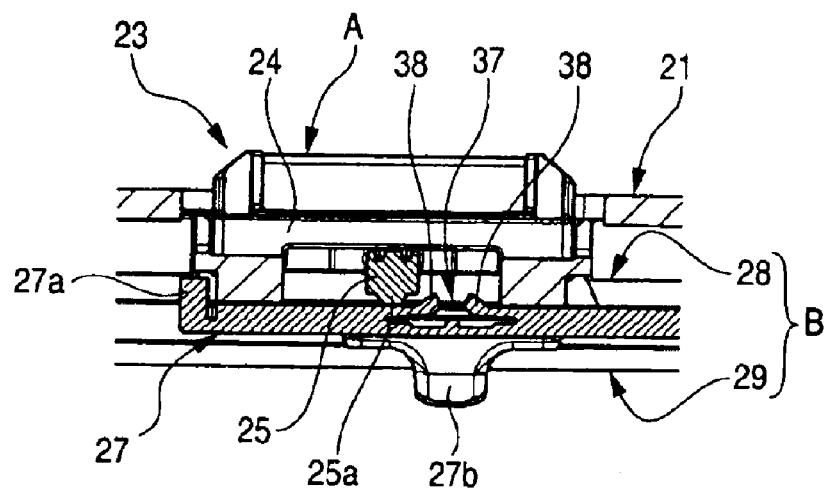
FIGS. 3A and 3B are cross-sectional views of an important portion, explanatory of an operation of engagement between a distal end portion of a switch lever and an engagement portion of the switch knob.
Figure 3B:
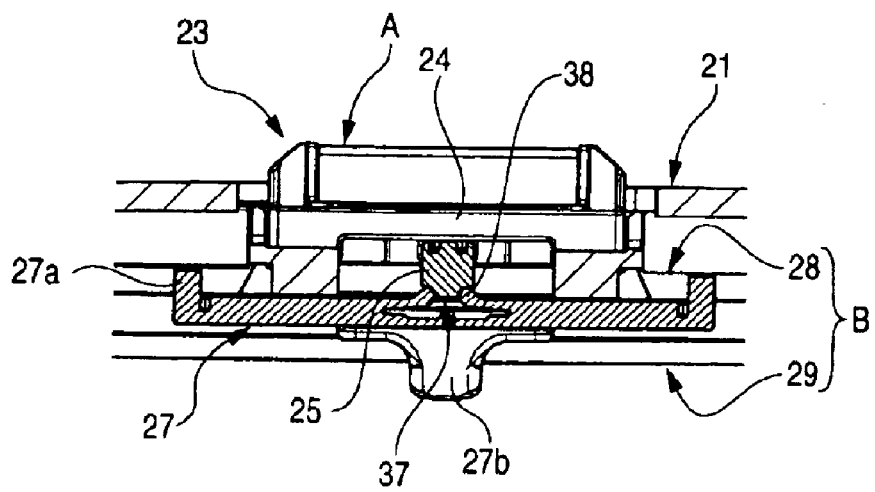

At this time, the distal end portion 25a of the switch lever 25 is not engaged in the engagement portion 37 of the switch knob 27 as shown in FIG. 3A since the design portion B is merely mounted on the roof trim 21. However, merely by sliding the switch knob 27 after this mounting operation, the distal end portion 25a of the switch lever 25 can be inserted into the engagement portion 17 formed between the distal ends of the pair of elastic retaining lances 38, as shown in FIG. 3B.

Figure 4A:
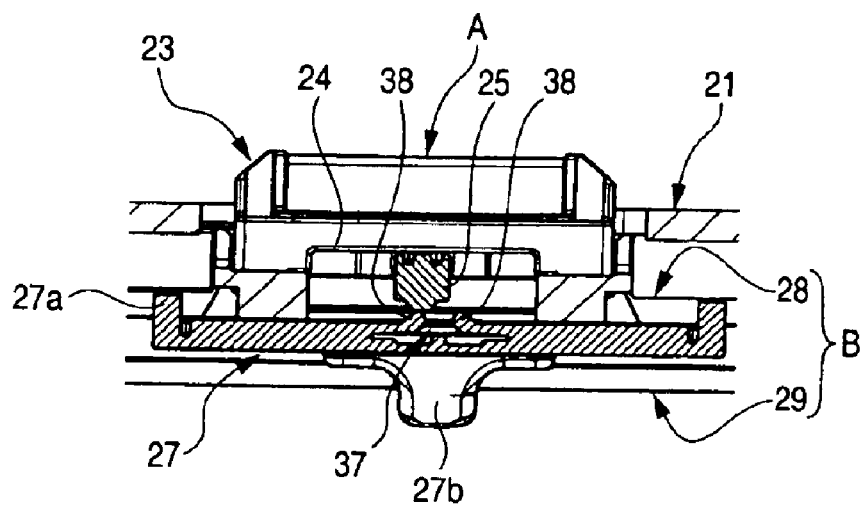
FIGS. 4A and 4B are cross-sectional views of the important portion, explanatory of the operation of engagement between the distal end portion of the switch lever and the engagement portion of the switch knob.
Figure 5A:
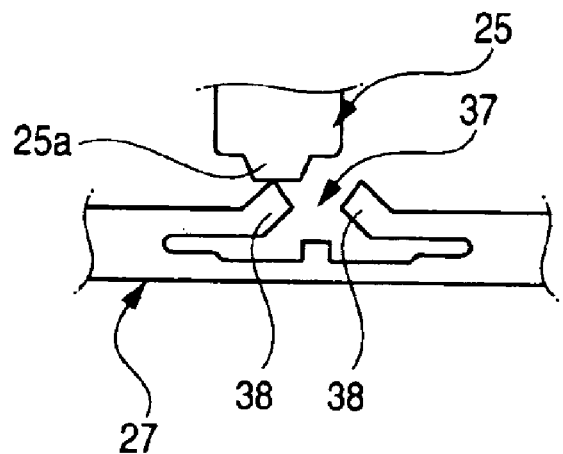
FIGS. 5A and 5B are views explanatory of an operation of elastic retaining lances serving as a retaining unit of the engagement portion.
Figure 5B:
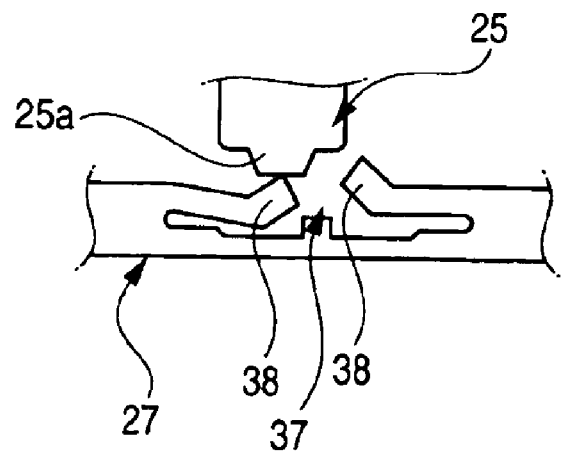
Figure 6:
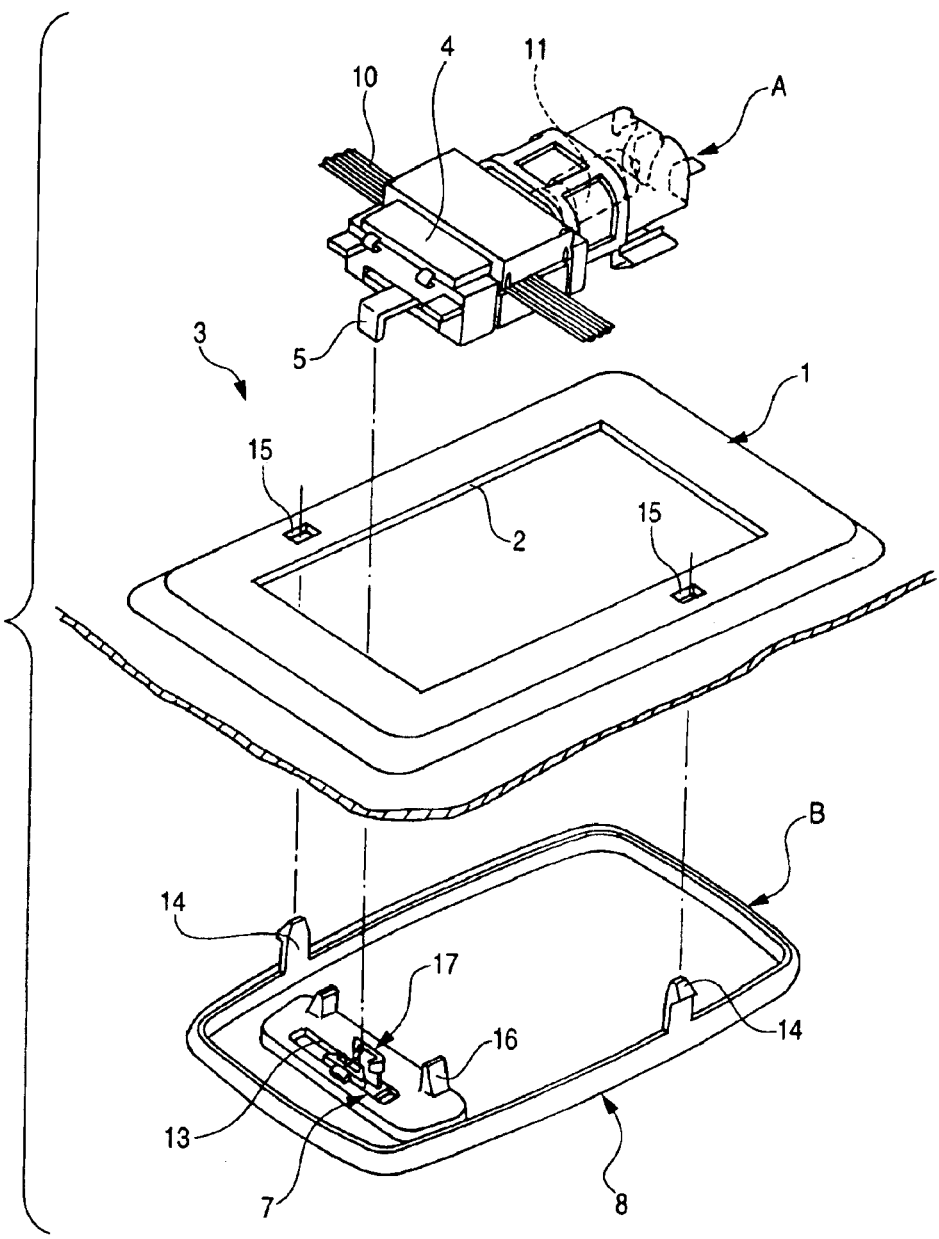
FIG. 6 is an exploded, perspective view explanatory of a related lamp unit-mounting structure.
Figure 7A:
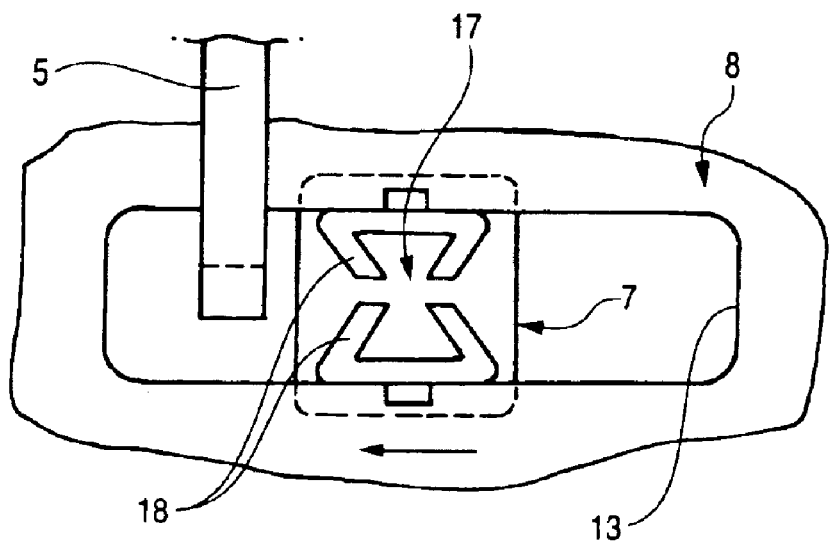
FIGS. 7A and 7B are views explanatory of an operation of engagement between a distal end portion of a switch lever and a retaining unit of an engagement portion of a switch knob.
Figure 7B:
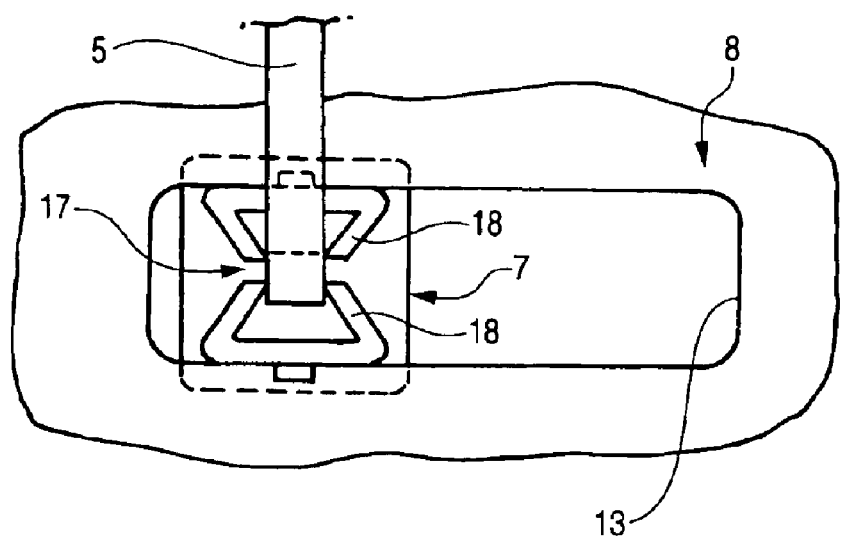
Figure 8:
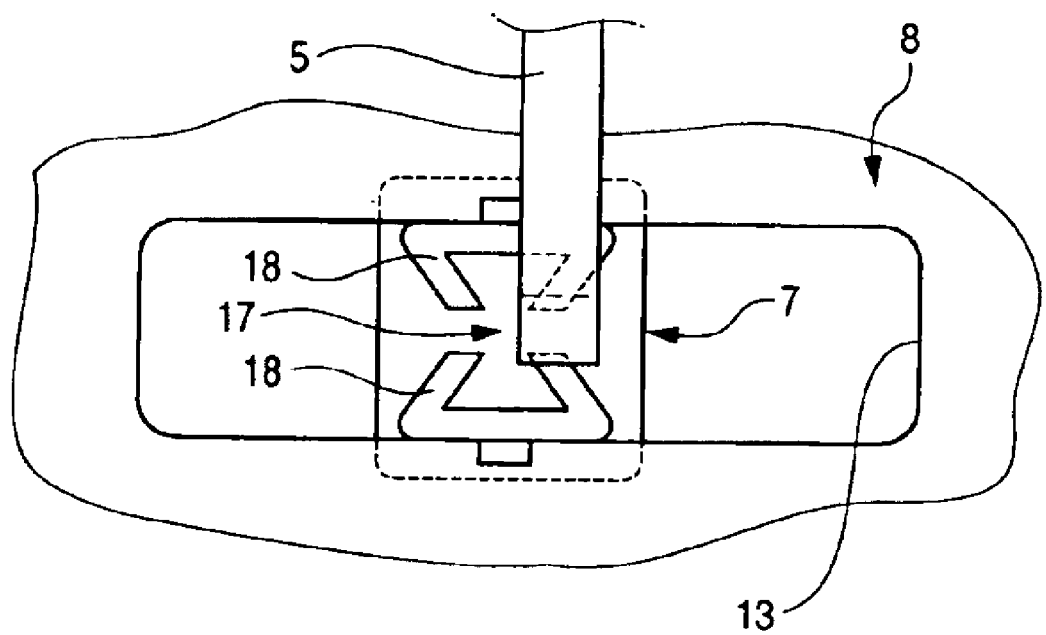
FIG. 8 is a view explanatory of an improper condition in which a distal end of the switch lever abuts against the retaining unit of the engagement portion of the switch knob in a mounting direction during the mounting operation.

Even when the positional relation between the distal end portion 25a of the switch lever 25 and the elastic retaining lances 38 of the switch knob 27 is such that the distal end portion 25a abuts against the elastic retaining lance 38 in the mounting direction as shown in FIG. 4A, the switch lever 25 will not impart an impact to the elastic lances 38 as shown in FIG. 5 since these elastic lances 38 can be elastically deformed.

Figure 4B:
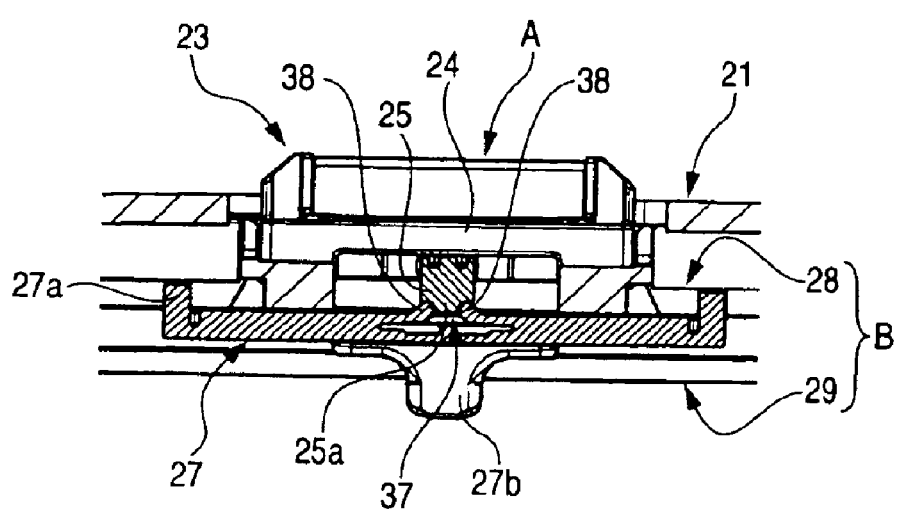

Then, merely by sliding the switch knob 27 after the design portion B is mounted on the roof trim 21, the distal end portion 25a of the switch lever 25 can be inserted into the engagement portion 37 between the pair of elastic retaining lances 38 as shown in FIG. 4B.

Therefore, when mounting the design portion B relative to the lamp-mounting window 22, it is not necessary to adjust the position of the switch knob 27 so that the distal end portion 25a of the switch lever 25 can be positively inserted into the engagement portion 37. The design portion B is fixed to the roof trim 21 to cover the lamp-mounting window 22. The switch knob 27, slidably retained on the holder 28 of the design portion B, is slid from the inside of the car room, and merely by doing so, the switch lever 25 can be positively engaged in the engagement portion 37 of the switch knob 27 regardless of the retaining position of the switch lever 25 since the retaining unit, provided at the engagement portion 37 of the switch knob 27, allows the switch lever 25 to be inserted into the engagement portion 37 in the sliding direction and in the direction of mounting of the design portion B relative to the roof trim 21.

And besides, even when the positional relation between the distal end portion 25a of the switch lever 25 and the elastic retaining lances 38 of the switch knob 27 is such that the distal end portion 25a abuts against the elastic retaining lance 38 in the mounting direction, the switch lever 25 will not impart an impact to the elastic lances 38, and therefore the design portion B will not be improperly mounted on the roof trim 21, and the distal end portion 25a of the switch lever 25 never fails to be positively engaged in the engagement portion 31.

Therefore, the operator, engaged in the mounting operation, is not required to effect any positioning operation for fixing the design portion B to the roof trim 21. Th mounting operation can be carried out easily. Also, the switch lever 25 can be easily and positively engaged in the engagement portion 37 of the switch knob 27, and therefore a defective connection during the assembling operation is prevented, so that the quality is enhanced.

Furthermore, the retaining unit is simplified in structure since this retaining unit is formed by the pair of elastic retaining lances 38.

In the lamp unit mounting structure of the present invention, the constructions of the vehicle body panel, the interior wall member, the lamp unit, the retaining unit, the cable and so on are not limited to those in the above embodiment, but can take various forms on the basis of the subject matter of the invention.

For example, in the above embodiment, although the design portion B comprises the holder 28 and the cover lens 29, the design portion is not limited to this construction, and can comprise only a cover lens (as in the conventional structure), in which case the switch knob is retained on the cover lens.

Although the above embodiment has been described in connection with the case where the room lamp (electrical equipment) is mounted on the roof trim (interior wall member), the invention can be applied also to the cases where a map lamp is mounted on the roof trim and where a courtesy lamp or the like is mounted on a door trim (interior wall member) covering a door panel (vehicle body panel).

The wires, installed on the interior wall member, are not limited to the FFC used in the above embodiment, but a flat circuit member such as an FPC (flexibl printed circuit board) and a ribbon cable, a wire harness or others can be used.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A switch structure of a lamp unit mounted on a wall member, comprising:
   a switch member, including a switch lever which slides in a first direction for turning on or off the lamp unit; and
   a switch knob, including an engagement portion for engaging with the switch lever, and the switch knob being slidably retained on a design member,
   wherein the engagement portion of the switch knob is configured to receive the switch lever by movement of the switch lever in the first direction and in a second direction in which the design member is mounted to the wall member while the engagement portion is elastically deformed.

2. The switch structure as set forth in claim 1, wherein the engagement portion includes a pair of elastic retaining lances which extend at least partially in the first direction; and
   wherein respective distal ends of the elastic retaining lances are opposed to each other.

3. The switch structure as set forth in claim 2, where the elastic retaining lances extend toward each other.

4. The switch structure as set forth in claim 1, wherein the engagement portion is elastically deformed in the second direction when the switch lever is inserted in the engagement portion of the switch knob in the second direction.

5. A switch structure of a lamp unit mounted on a wall member, comprising:
   switch member including a switch lever which slides in a first direction for turning on or off the lamp unit; and
   a switch knob provided on a design member and including an engagement means for engaging the switch lever when the switch lever is inserted in the first direction and in a second direction in which the switch knob is mounted to the wall member while the engagement portion is elastically deformed.

6. The switch structure as set forth in claim 5, wherein the engagement means includes a pair of elastic retaining lances which extend partially toward each other in the first direction.

7. The switch structure as set forth in claim 5, wherein the engagement means is elastically deformed in the second direction when the switch lever is inserted into the engagement portion of the switch knob in the second direction.

* * * * *